United States Patent
Sakai et al.

(10) Patent No.: US 8,783,497 B2
(45) Date of Patent: Jul. 22, 2014

(54) FILLER PLUG FOR HYDRAULIC DEVICE

(75) Inventors: Ryuji Sakai, Kakogawa (JP); Hisao Wada, Kobe (JP); Tatsuya Imai, Akashi (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 0 days.

(21) Appl. No.: 13/699,170

(22) PCT Filed: Jun. 1, 2011

(86) PCT No.: PCT/JP2011/003090
§ 371 (c)(1),
(2), (4) Date: Nov. 20, 2012

(87) PCT Pub. No.: WO2011/155156
PCT Pub. Date: Dec. 15, 2011

(65) Prior Publication Data
US 2013/0062349 A1   Mar. 14, 2013

(30) Foreign Application Priority Data

Jun. 11, 2010   (JP) ................................ 2010-133557

(51) Int. Cl.
*F16B 35/00* (2006.01)
(52) U.S. Cl.
USPC ............ 220/284; 220/288; 411/399; 411/378
(58) Field of Classification Search
USPC .......... 220/284, 288, 289, 293; 215/329, 316; 411/399, 168, 57.1, 80.1, 80.5, 80.6, 411/370, 378, 382, 505, 504, 542, 369, 411/371.1
See application file for complete search history.

(56) References Cited

U.S. PATENT DOCUMENTS 3,730,563 A * 5/1973 Hanback et al. ............... 285/114
3,788,185 A * 1/1974 Gutshall .................... 411/371.1
3,882,752 A * 5/1975 Gutshall .................... 411/371.1
(Continued)

FOREIGN PATENT DOCUMENTS

JP   U-54-177450   12/1979
JP   U-01-133568   9/1989
(Continued)

OTHER PUBLICATIONS

International Search Report issued in International Application No. PCT/JP2011/003090 dated Aug. 30, 2011.

*Primary Examiner* — Anthony Stashick
*Assistant Examiner* — James Way
(74) *Attorney, Agent, or Firm* — Oliff PLC (57) ABSTRACT

A filler plug is configured such that: a head portion is formed on an upper end of an external thread; a sealing portion formed at the head portion strongly contacts a funnel-shaped inclined inner peripheral surface formed at one end of an internal thread of a hydraulic device oil passage by tightening the external thread with respect to the internal thread; an upper peripheral surface of the sealing portion is tapered; a circular constricted portion is formed between the sealing portion and the upper end of the external thread; and a dimensionless value of a head portion height H1 from an upper surface of the head portion to the sealing portion, that is, a dimensionless value obtained by dividing the head portion height H1 by a nominal designation value of the external thread portion, ranges from 0.4 to 0.7.

6 Claims, 4 Drawing Sheets

(56) References Cited

U.S. PATENT DOCUMENTS

| | | | |
|---|---|---|---|
| 4,416,573 A * | 11/1983 | Matalis et al. | 411/378 |
| 4,462,730 A * | 7/1984 | Knohl | 411/371.1 |
| 6,071,051 A * | 6/2000 | Reed | 411/5 |
| 6,375,232 B1 * | 4/2002 | Robinson | 285/220 |
| 6,394,725 B1 * | 5/2002 | Dicke | 411/399 |
| 6,435,788 B2 * | 8/2002 | Reed | 411/178 |
| 7,033,121 B2 * | 4/2006 | Kirchen | 411/48 |
| 7,740,433 B2 * | 6/2010 | Miyoshi et al. | 411/371.1 |
| 7,896,600 B2 * | 3/2011 | Laboda | 411/399 |
| 8,186,921 B2 * | 5/2012 | Lowman | 411/371.1 |

FOREIGN PATENT DOCUMENTS

| | | |
|---|---|---|
| JP | A-02-221768 | 9/1990 |
| JP | U-04-101858 | 9/1992 |
| JP | A-06-017935 | 1/1994 |
| JP | A-2006-283825 | 10/2006 |
| JP | A-2006-300109 | 11/2006 |

* cited by examiner

Prior Art

FILLER PLUG FOR HYDRAULIC DEVICE

TECHNICAL FIELD

The present invention relates to a filler plug for a hydraulic device, the filler plug being capable of sealing a through hole, such as a process hole (waste hole), created to form, for example, an oil passage in a hydraulic device.

BACKGROUND ART

Figure 5:
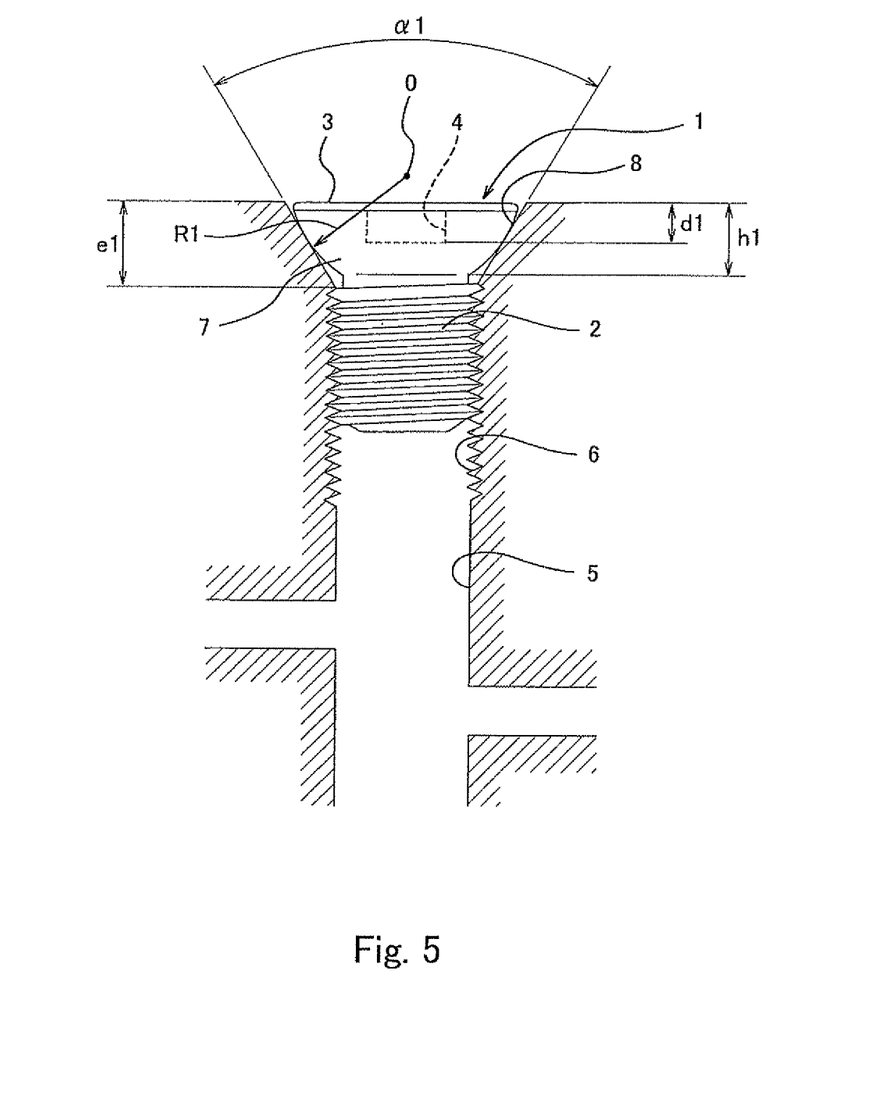
FIG. 5 is a partial cross-sectional front view showing a state where a conventional filler plug for a hydraulic device is attached to the opening end portion of the oil passage formed in the hydraulic device.

One conventional example of the above-described filler plug for the hydraulic device is shown in FIG. 5 (see PTL 1, for example). As shown in FIG. 5, a filler plug 1 for a hydraulic device includes an external thread portion 2. A head portion 3 having a larger diameter than the external thread portion 2 is formed on an upper end portion of the external thread portion 2. An engaging recess 4 is formed on an upper end surface of the head portion 3. The engaging recess 4 is, for example, a hexagon socket.

As shown in FIG. 5, when sealing an opening end portion of an oil passage 5 (through hole) formed in the hydraulic device by using the filler plug 1, a hexagonal wrench (tool) is caused to engage with the engaging recess 4 formed on the head portion 3 of the filler plug 1, and the external thread portion 2 of the filler plug 1 is tightened with respect to an internal thread portion 6 formed in the oil passage 5 of the hydraulic device. With this, a jaw-shaped portion 7 formed at a lower portion of the head portion 3 of the filler plug 1 can be caused to strongly contact a funnel-shaped inclined inner peripheral surface 8 formed at the opening end portion of the oil passage 5. Thus, the opening end portion of the oil passage 5 can be sealed by using the filler plug 1.

As shown in FIG. 5, an axial cross-sectional shape of the jaw-shaped portion 7 of the filler plug 1 is a circular-arc shape having a curvature radius R1 (center O). Therefore, even if a taper angle αl of the funnel-shaped inclined inner peripheral surface 8 varies, the jaw-shaped portion 7 can be caused to closely contact the inclined inner peripheral surface 8. Thus, the opening end portion of the oil passage 5 can be surely sealed.

Here, for example, when the pressure in the oil passage 5 shown in FIG. 5 is high, it is necessary to tighten the external thread portion 2 of the filler plug 1 with respect to the internal thread portion 6 at a high tightening torque to cause the jaw-shaped portion 7 of the filler plug 1 to further strongly contact the inclined inner peripheral surface 8 formed at the opening end portion of the oil passage 5. However, if the tightening torque is high, the engaging recess 4 collapses. In order to avoid this, it is necessary to decrease contact pressure, and it is necessary to increase an engaging force between the tool and the engaging recess 4 in a tightening direction by increasing a depth d1 of the engaging recess 4 of the filler plug 1 with which the tool engages and a height h1 of the head portion 3.

CITATION LIST

Patent Literature

PTL 1: Japanese Laid-Open Patent Application Publication No. 2006-283825

SUMMARY OF INVENTION

Technical Problem

However, in a case where the depth d1 of the engaging recess 4 of the filler plug 1 shown in FIG. 5 and the height h1 of the head portion 3 of the filler plug 1 are increased, it is necessary to increase a depth e1 of the inclined inner peripheral surface 8 formed on the opening end portion of the oil passage 5 to accommodate the head portion 3. As above, if the depth e1 of the inclined inner peripheral surface 8 is increased, the thickness of the hydraulic device increases, and this causes, for example, the increases in the size and cost of the hydraulic device.

As shown in FIG. 5, when the external thread portion 2 of the filler plug 1 is tightened with respect to the internal thread portion 6 at a high tightening torque, the circular-arc jaw-shaped portion 7 having the large curvature radius R1 strongly contacts the inclined inner peripheral surface 8 formed at the opening end portion of the oil passage 5. In this configuration in which a sealing structure is formed by the strong contact between the jaw-shaped portion 7 and the inclined inner peripheral surface 8, since a collapse margin is small, the jaw-shaped portion 7 may not be able to appropriately perform plastic deformation, so that a high-performance sealing state may not be able to be realized. Therefore, the high-pressure oil passage 5 may not be able to be surely sealed.

The present invention was made to solve the above problems, and an object of the present invention is to provide a filler plug for a hydraulic device, the filler plug being capable of realizing high-performance sealing of a through hole, in which the pressure is high, of the hydraulic device by tightening the filler plug with respect to an internal thread portion formed in the through hole at a high tightening torque and also capable of reducing the size and cost of the hydraulic device by reducing the thickness of the hydraulic device, the reduction in the thickness of the hydraulic device being realized by realizing a small height of a head portion of the filler plug and a small depth of a funnel-shaped inclined inner peripheral surface formed in the through hole of the hydraulic device.

Solution to Problem

A filler plug for a hydraulic device according to the present invention is a filler plug for a hydraulic device, the filler plug being made of a metal and including an external thread portion, wherein: a head portion having a larger diameter than the external thread portion is formed on an upper end portion of the external thread portion; a circular sealing portion formed at a lower edge portion of the head portion is able to be caused to strongly contact a funnel-shaped inclined inner peripheral surface formed at one end of an internal thread portion formed in a through hole of the hydraulic device in such a manner that a tool is caused to engage with an engaging recess formed on an upper end surface of the head portion and the external thread portion is tightened with respect to the internal thread portion; an upper peripheral surface portion of the sealing portion is formed as a tapered portion configured to increase in diameter in a direction from the sealing portion toward an upper end portion of the head portion; a circular constricted portion is formed between the sealing portion and the upper end portion of the external thread portion; and a dimensionless value of a head portion height from the upper end surface of the head portion to the sealing portion, that is, a dimensionless value obtained by dividing the head portion height by a nominal designation value of the external thread portion ranges from 0.4 to 0.7.

In the filler plug for the hydraulic device according to the present invention, the tool is caused to engage with the engaging recess formed on the head portion, and the external thread portion of the filler plug is tightened with respect to the internal thread portion formed in the through hole of the hydraulic device. With this, the circular sealing portion formed at the lower edge portion of the head portion of the filler plug can be caused to strongly contact the funnel-shaped inclined inner peripheral surface formed at one end of the internal thread portion to perform the plastic deformation, and this circular contact portion (sealing portion) is formed on the inclined inner peripheral surface along the entire periphery. On this account, the through hole can be sealed. The filler plug is detachable from the internal thread portion and can be used for reassembling.

Then, the tapered portion is formed at the upper peripheral surface portion of the sealing portion, and the constricted portion is formed at a lower portion of the sealing portion. With this, the sealing portion can be formed to project toward the funnel-shaped inclined inner peripheral surface formed on the hydraulic device. On this account, the tapered portion and the constricted portion can define the position of the contact portion between the sealing portion which performs the plastic deformation when the external thread portion is tightened with respect to the internal thread portion and the funnel-shaped inclined inner peripheral surface and the width (sealing width) of the contact portion.

In a mechanism in which the sealing portion which strongly contacts the funnel-shaped inclined inner peripheral surface of the hydraulic device when the external thread portion of the filler plug is tightened with respect to the internal thread portion performs the plastic deformation, since the thickness of a thinnest portion between the engaging recess and the tapered portion is determined based on the head portion height, the dimensionless value of the head portion height can define the structural strength of the head portion including the sealing portion and its vicinity.

Here, the dimensionless value of the head portion height is set to 0.4 to 0.7. With this, even if the filler plug is tightened at a high tightening torque to, for example, seal the through hole in which the pressure is high, each of the plastic deformation of the sealing portion and the plastic strain of the vicinity of the sealing portion can be adjusted within an acceptable range, and the through hole in which the pressure is high can be surely sealed by the sealing portion of the filler plug. In addition, since the height of the head portion can be made small, a depth of the funnel-shaped inclined inner peripheral surface formed in the through hole of the hydraulic device can be made small, and the thickness of the hydraulic device can be made small.

If the dimensionless value of the head portion height is smaller than 0.4, the plastic strain of the head portion including the sealing portion and its vicinity when the filler plug is tightened exceeds the acceptable range. If the dimensionless value exceeds 0.7, the height of the head portion increases, and an adequate effect for reducing the thickness of the hydraulic device cannot be obtained.

In the filler plug for the hydraulic device according to the present invention, a downwardly inclined outer peripheral surface may be formed at a lower peripheral surface portion of the sealing portion, the inclined outer peripheral surface may decrease in diameter in a direction from the sealing portion toward the external thread portion, and a recess angle of the inclined outer peripheral surface with respect to a horizontal plane perpendicular to a central axis of the external thread portion may range from 7° to 20°.

A recess angle of the inclined outer peripheral surface can define the structural strengths of the sealing portion and its vicinity and the width (sealing width) of the contact portion between the sealing portion and the funnel-shaped inclined inner peripheral surface.

Here, the recess angle is set to 7° to 20°. With this, when the sealing portion strongly contacts the funnel-shaped inclined inner peripheral surface, each of the plastic deformation of the sealing portion and the plastic strain of the vicinity of the sealing portion falls within the acceptable range. Thus, the sealing portion can appropriately perform the plastic deformation, and the sealing width within a target range can be formed. Therefore, the high-performance sealing of the through hole can be realized.

If the recess angle is smaller than 7°, a gap between the inclined outer peripheral surface formed at the lower peripheral surface portion of the sealing portion and the inclined inner peripheral surface of the hydraulic device increases. Therefore, even if the sealing portion performs the plastic deformation, the sealing width cannot be increased up to the target range, and the plastic strain tends to increase. If the recess angle exceeds 20°, the structural strengths of the sealing portion and its vicinity increase. Thus, the plastic deformation of the sealing portion itself decreases, and the sealing width within the target range cannot be realized.

In the filler plug for the hydraulic device according to the present invention, a lower limit of a curvature radius of the circular constricted portion may be 0.2 mm, and an upper limit of the curvature radius of the circular constricted portion may be a value obtained by multiplying 0.1 by the nominal designation value of the external thread portion.

The circular constricted portion is formed such that when the external thread portion of the filler plug is tightened with respect to the internal thread portion to cause the sealing portion to strongly contact the funnel-shaped inclined inner peripheral surface, the portion where the constricted portion is formed does not contact the funnel-shaped inclined inner peripheral surface, and the sealing portion can surely, strongly contact the funnel-shaped inclined inner peripheral surface.

The curvature radius of the constricted portion can define how much the force acting on the head portion of the filler plug when the filler plug is tightened concentrates on the constricted portion. Further, the curvature radius of the constricted portion can define the structural strengths of the constricted portion, the sealing portion, and its vicinity and the degree of the plastic deformation of the sealing portion.

Here, the lower limit of the curvature radius of the constricted portion is set to 0.2 mm, and the upper limit thereof is set to a value obtained by multiplying 0.1 by the nominal designation value of the external thread portion. With this, the concentration stress can be prevented from being applied to the constricted portion when the filler plug is tightened, and the sealing width between the sealing portion and the funnel-shaped inclined inner peripheral surface can be set within the target range.

If the curvature radius is shorter than 0.2 mm that is the lower limit, the stress concentration applied to the constricted portion exceeds the acceptable range. For example, when the nominal designation of the external thread portion is M7, and the curvature radius exceeds 0.7 mm (0.1×7 (the nominal designation value of the external thread portion)), the structural strengths of the constricted portion, the sealing portion, and its vicinity increase. Thus, the plastic deformation of the sealing portion itself decreases, and the sealing width within the target range cannot be realized.

In the filler plug for the hydraulic device according to the present invention, a dimensionless value of an engaging recess depth, that is, a dimensionless value obtained by dividing a depth of the engaging recess, which is formed on the head portion and with which the tool is able to engage, by the nominal designation value of the external thread portion may range from 0.30 to 0.33.

According to the filler plug, when the tool is caused to engage with the engaging recess formed on the head portion, and the external thread portion of the filler plug is tightened with respect to the internal thread portion, twisting force acts on the head portion of the filler plug. The dimensionless value of the engaging recess depth can define the engaging force between the engaging recess and the tool in the tightening direction in consideration of the twisting force.

Here, the dimensionless value of the engaging recess depth is set to 0.30 to 0.33. With this, the engaging force between the engaging recess and the tool in the tightening direction can be set within the target range. Thus, by tightening the filler plug at a high tightening torque, the through hole in which the pressure is high can be surely sealed by the sealing portion of the filler plug. In addition, the depth of the engaging recess can be made small. With this, the height of the head portion can be made small. Therefore, the depth of the funnel-shaped inclined inner peripheral surface formed in the through hole of the hydraulic device can be made small, and the thickness of the hydraulic device can be made small.

If the dimensionless value of the engaging recess depth is smaller than 0.30, the engaging force between the engaging recess and the tool does not reach the target range. If the dimensionless value exceeds 0.33, an adequate effect for reducing the thickness of the hydraulic device cannot be obtained.

In the filler plug for the hydraulic device according to the present invention, a taper angle of the tapered portion formed at the upper peripheral surface portion of the sealing portion may be substantially 40°, and a taper angle of the funnel-shaped inclined inner peripheral surface may be substantially 60°.

In a mechanism in which when the external thread portion of the filler plug is tightened with respect to the internal thread portion, the sealing portion of the filler plug which is caused to strongly contact the funnel-shaped inclined inner peripheral surface of the hydraulic device performs the plastic deformation to form the contact portion, the taper angle of the tapered portion formed at the upper peripheral surface portion of the sealing portion and the taper angle of the funnel-shaped inclined inner peripheral surface can define the width (the sealing width) of the contact portion and the plastic deformation and plastic strain of the head portion and constricted portion of the filler plug.

Here, the taper angle of the tapered portion formed at the upper peripheral surface portion of the sealing portion is set to substantially 40°, and the taper angle of the funnel-shaped inclined inner peripheral surface is set to substantially 60°. With this, even if the height of the head portion of the filler plug is made small, each of the plastic deformation of the sealing portion and the plastic strain of the vicinity of the sealing portion when the filler plug is tightened at a high tightening torque to, for example, seal the through hole in which the pressure is high can be adjusted within the acceptable range. Thus, the through hole in which the pressure is high can be surely sealed by the sealing portion of the filler plug.

Advantageous Effects of Invention

According to the filler plug for the hydraulic device according to the present invention, by setting the dimensionless value of head portion height to 0.4 to 0.7, the filler plug can be tightened with respect to the internal thread portion formed in the through hole at a high tightening torque and can realize high-performance sealing of the through hole in which the pressure is high. In addition, the height of the head portion can be made small, and the depth of the funnel-shaped inclined inner peripheral surface formed in the through hole of the hydraulic device can be made small. With this, the thickness of the hydraulic device can be made small, so that the reductions in the size and cost of the hydraulic device can be realized.

DESCRIPTION OF EMBODIMENTS

Hereinafter, one embodiment of a filler plug for a hydraulic device according to the present invention will be explained in reference to FIGS. 1 to 4. As shown in FIG. 3, a filler plug 11 for a hydraulic device can realize high-performance sealing of an opening end portion of, for example, an oil passage 13 (through hole) formed in a hydraulic device 12, such as a hydraulic valve or a hydraulic pump, by tightening an external thread portion 15 of the filler plug 11 with respect to an internal thread portion 14 of the oil passage 13 at a high tightening torque. A material of the filler plug 11 is steel, such as SCM435 that is thermal refined steel, but the other metal may be used.

Figure 1:
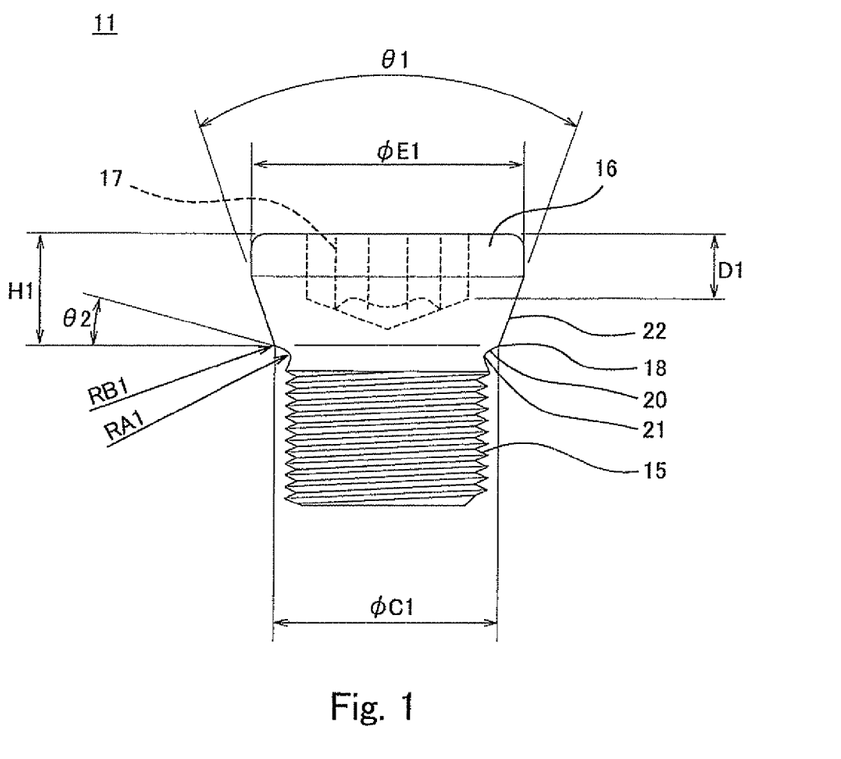
FIG. 1 is a front view showing a filler plug for a hydraulic device according to one embodiment of the present invention.
Figure 2:
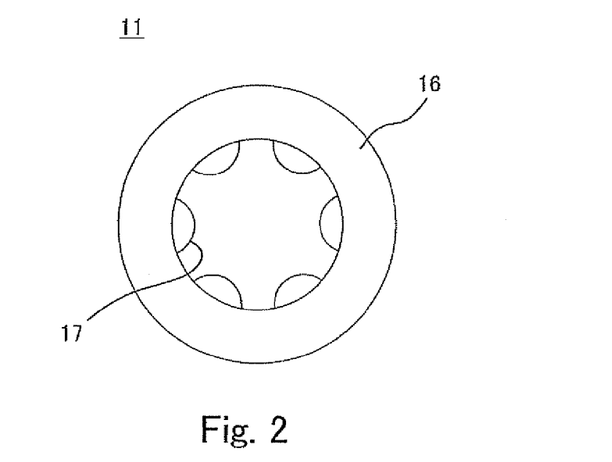
FIG. 2 is a plan view showing the filler plug according to the embodiment shown in FIG. 1.
Figure 3:
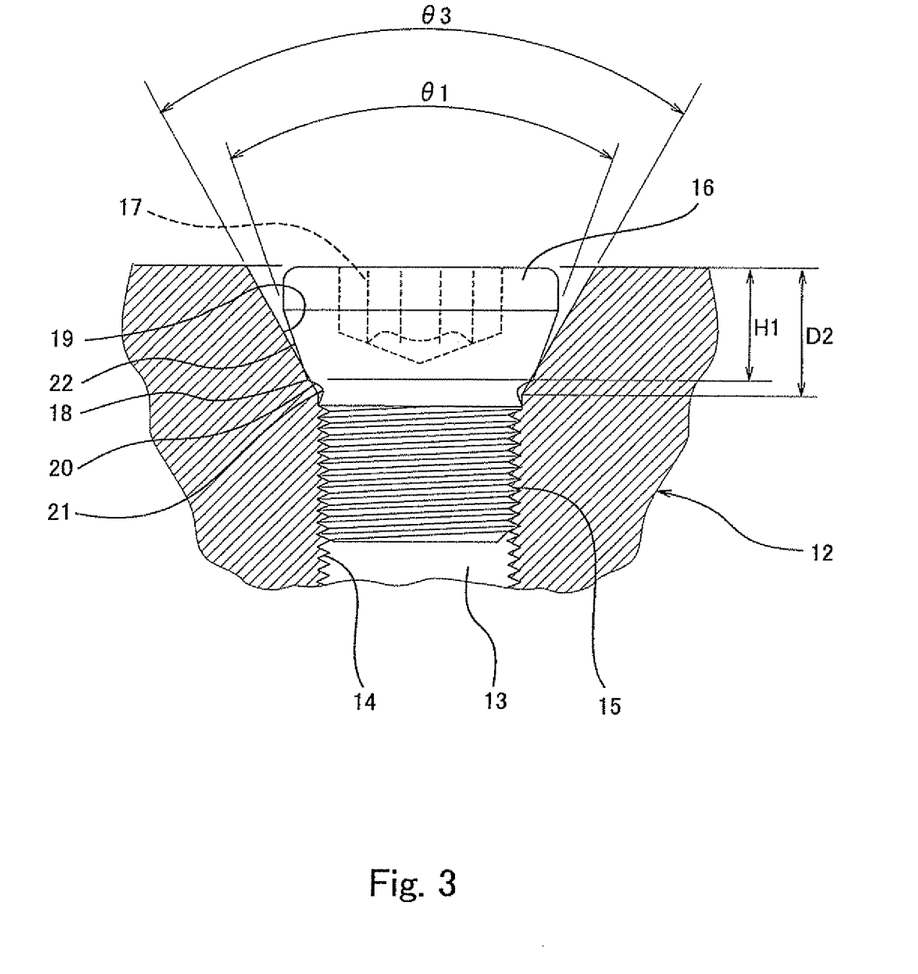
FIG. 3 is a partially cross-sectional front view showing a state where the filler plug according to the embodiment shown in FIG. 1 is attached to an opening end portion of an oil passage formed in the hydraulic device.

As shown in FIGS. 1 and 2, the filler plug 11 for the hydraulic device includes the external thread portion 15. A head portion 16 having a larger diameter than the external thread portion 15 is formed on an upper end portion of the external thread portion 15. An engaging recess 17 is formed on an upper end surface of the head portion 16.

The engaging recess 17 is formed such that: a predetermined tool is caused to engage with the engaging recess 17 by an operator; and the external thread portion 15 formed on the filler plug 11 can be tightened with respect to the internal thread portion 14 formed in the oil passage 13 (through hole) of the hydraulic device 12 shown in FIG. 3. Examples of the engaging recess 17 include polygonal holes, such as a Torx (trademark) hole and a hexagon socket.

As shown in FIG. 1, a circular sealing portion 18 is formed at a lower edge portion of the head portion 16.

Figure 4:
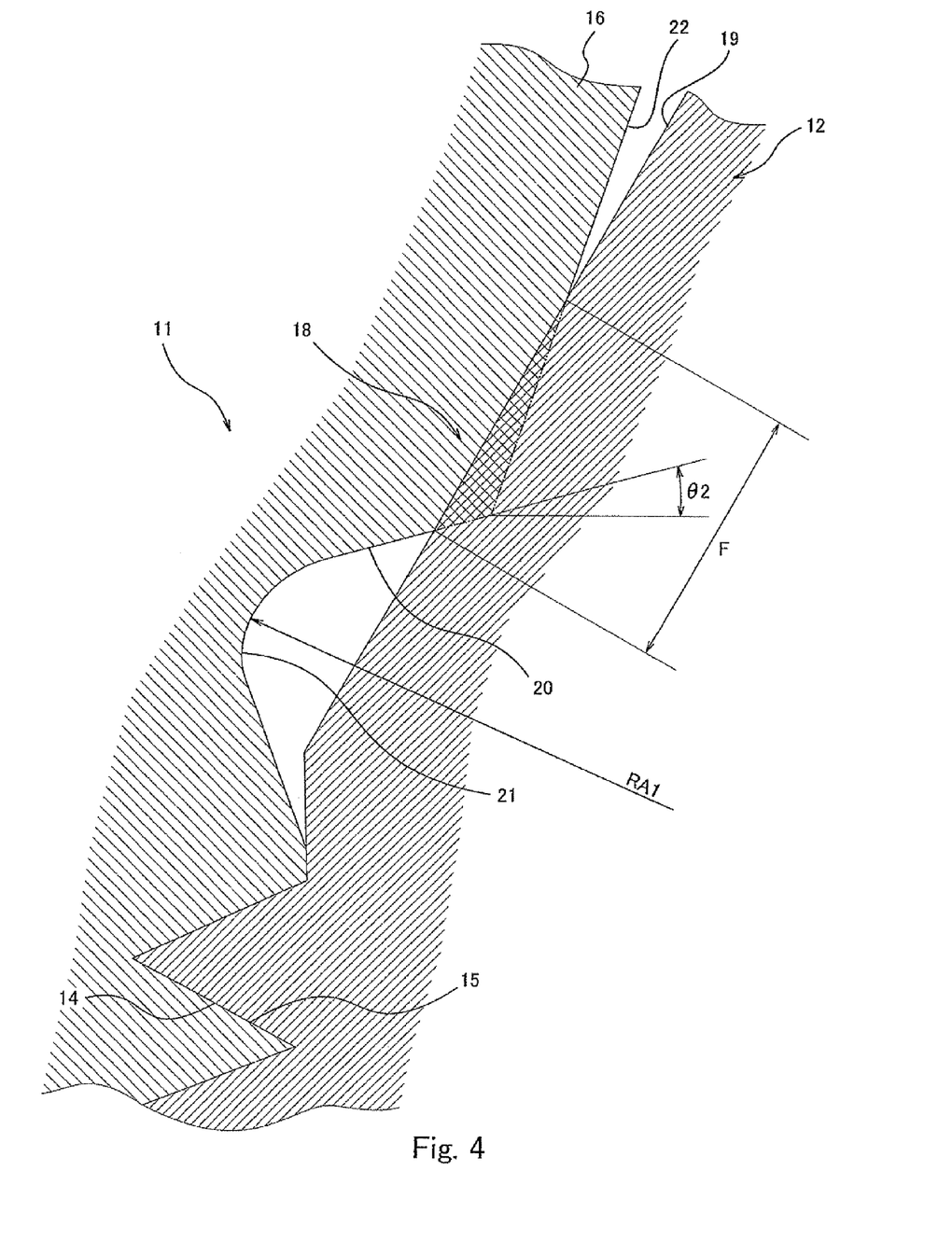
FIG. 4 is a partially enlarged cross-sectional view showing a sealing portion and constricted portion of the filler plug according to the embodiment shown in FIG. 3.

As shown in FIGS. 3 and 4, the sealing portion 18 is formed such that when the external thread portion 15 of the filler plug 11 is tightened with respect to the internal thread portion 14 of the oil passage 13, the sealing portion 18 can strongly contact a funnel-shaped inclined inner peripheral surface 19 formed at one end of the internal thread portion 14 to form a sealing structure by this circular contact portion.

Then, a head portion height H1 from the upper end surface of the head portion 16 to the sealing portion 18 is determined such that a dimensionless value of the head portion height H1, that is, a dimensionless value obtained by dividing the head portion height H1 by a nominal designation value of the external thread portion 15 ranges from 0.4 to 0.7.

For example, when a nominal designation of the external thread portion 15 of the filler plug 11 is M7, the head portion height H1 ranges from 2.8 to 4.9 mm (=7×(0.4 to 0.7)). Therefore, when the nominal designation of the external thread portion 15 is each of M5 to M10, an acceptable range of the head portion height H1 can be determined by multiplying each of 5 to 10 that are the nominal designation values by 0.4 to 0.7 that are the dimensionless values of the head portion height H1.

The external thread portion 15 having the nominal designation of each of M5 to M10 is suitably foamed on the filler plug used to seal the opening end portion of the oil passage 13 formed in the hydraulic device 12, such as a hydraulic valve or a hydraulic pump.

As shown in FIGS. 1 and 4, a downwardly inclined outer peripheral surface 20 is formed at a lower peripheral surface portion of the sealing portion 18. The inclined outer peripheral surface 20 decreases in diameter in a direction from the sealing portion 18 toward the external thread portion 15. A recess angle of the inclined outer peripheral surface 20 with respect to a horizontal plane perpendicular to a central axis of the external thread portion 15 ranges from 7° to 20°.

Further, as shown in FIGS. 1 and 4, a circular constricted portion 21 is formed between the sealing portion 18 and the upper end portion of the external thread portion 15. The lower limit of a curvature radius RA1 of the circular constricted portion 21 is 0.2 mm, and the upper limit thereof is a value obtained by multiplying 0.1 by the nominal designation value of the external thread portion 15. Then, an upper portion of the circular constricted portion 21 is formed by the inclined outer peripheral surface 20. In addition, the diameter of a bottom portion of the constricted portion 21 is smaller than the diameter of the thread of the external thread portion 15.

Then, as shown in FIG. 1, a depth D1 of the engaging recess 17 which is formed on the head portion 16 and with which the tool can engage is determined such that a dimensionless value of the engaging recess depth D1, that is, a dimensionless value obtained by dividing the depth D1 by the nominal designation value of the external thread portion 15 ranges from 0.30 to 0.33.

For example, when the nominal designation of the external thread portion 15 of the filler plug 11 is M7, the engaging recess depth D1 ranges from 2.1 to 2.3 mm (≈7×(0.30 to 0.33)). Therefore, when the nominal designation of the external thread portion 15 is each of M5 to M10, an acceptable range of the engaging recess depth D1 can be determined by multiplying each of 5 to 10 that are the nominal designation values by 0.30 to 0.33 that are the dimensionless values of the engaging recess depth D1.

As shown in FIG. 3, an upper peripheral surface portion of the sealing portion 18 is formed as a tapered portion 22 which increases in diameter in a direction from the sealing portion 18 toward an upper end portion of the head portion 16. A taper angle θ1 of the tapered portion 22 is substantially 40°. Then, a taper angle θ3 of the funnel-shaped inclined inner peripheral surface 19 formed at the opening end portion of the oil passage 13 of the hydraulic device 12 is substantially 60°.

A curvature radius RB1 of the sealing portion 18 shown in FIG. 1 is substantially 0.3 mm or shorter. Then, a diameter C1 of the sealing portion 18 is determined such that a dimensionless value of the sealing portion diameter C1, that is, a dimensionless value obtained by dividing the diameter C1 by the nominal designation value of the external thread portion 15 ranges from 1.07 to 1.10. For example, when the nominal designation of the external thread portion 15 of the filler plug 11 is M7, the diameter C1 of the sealing portion 18 ranges from 7.5 to 7.7 mm (≈7×(1.07 to 1.10)). A diameter E1 of the head portion 16 is determined such that a dimensionless value of the head portion diameter E1, that is, a dimensionless value obtained by dividing the diameter E1 by the nominal designation value of the external thread portion 15 ranges from 1.31 to 1.37. For example, when the nominal designation of the external thread portion 15 of the filler plug 11 is M7, the diameter E1 of the head portion 16 ranges from 9.2 to 9.6 mm (≈7×(1.31 to 1.37)).

Next, the procedure of tightening the filler plug 11 configured as above with respect to the internal thread portion 14 of the oil passage 13 (through hole) formed in the hydraulic device 12, such as a hydraulic valve or a hydraulic pump, at, for example, a high tightening torque to seal the opening end portion of the oil passage 13 as shown in FIG. 3 and the actions of the filler plug 11 will be explained.

For example, the pressure in the oil passage 13 formed in the hydraulic device 12 is about 10 to 60 MPa, and the tightening torque of the filler plug 11 (in which the external thread portion 15 is M7) is about 20 Nm.

According to the filler plug 11 shown in FIG. 3, the tool is caused to engage with the engaging recess 17 formed on the head portion 16, and the external thread portion 15 of the filler plug 11 is tightened with respect to the internal thread portion 14 formed in the oil passage 13 of the hydraulic device 12. With this, the circular sealing portion 18 can be caused to strongly contact the funnel-shaped inclined inner peripheral surface 19 formed at one end of the internal thread portion 14 to perform the plastic deformation, and this circular contact portion (sealing portion) is formed on the inclined inner peripheral surface 19 along the entire periphery. On this account, the oil passage 13 in which the pressure is high can be sealed. The filler plug 11 is detachable from the internal thread portion 14 and can be used for reassembling.

Then, the tapered portion 22 is formed at the upper peripheral surface portion of the sealing portion 18, and the constricted portion 21 is formed at a lower portion of the sealing portion 18. With this, the sealing portion 18 can be formed to project toward the funnel-shaped inclined inner peripheral surface 19 formed on the hydraulic device 12. On this account, the tapered portion 22 and the constricted portion 21 can define the position of the contact portion between the sealing portion 18 which performs the plastic deformation when the external thread portion 15 is tightened with respect to the internal thread portion 14 and the funnel-shaped inclined inner peripheral surface 19 and the width (sealing width F) of the contact portion.

In a mechanism in which the sealing portion 18 which strongly contacts the funnel-shaped inclined inner peripheral surface 19 of the hydraulic device 12 when the external thread portion 15 of the filler plug 11 is tightened with respect to the internal thread portion 14 performs the plastic deformation, since the thickness of a thinnest portion between the engaging recess 17 and the tapered portion 22 is determined based on the head portion height H1, the dimensionless value of the head portion height H1 can define the structural strength of the head portion 16 including the sealing portion 18 and its vicinity.

Here, the dimensionless value of the head portion height H1 is set to 0.4 to 0.7. With this, even if the filler plug 11 is tightened at a high tightening torque to, for example, seal the oil passage 13 in which the pressure is high, each of the plastic deformation of the sealing portion 18 and the plastic strain of the vicinity of the sealing portion 18 can be adjusted within an acceptable range, and the oil passage 13 in which the pressure is high can be surely sealed by the sealing portion 18 of the filler plug 11. In addition, since the height H1 of the head portion 16 can be made small, a depth D2 of the funnel-shaped inclined inner peripheral surface 19 formed in the oil passage 13 of the hydraulic device 12 can be made small, and the thickness of the hydraulic device 12 can be made small.

If the dimensionless value of the head portion height H1 is smaller than 0.4, the plastic strain of the head portion 16 including the sealing portion 18 and its vicinity exceeds the acceptable range. If the dimensionless value exceeds 0.7, the height H1 of the head portion 16 increases, and an adequate effect for reducing the thickness of the hydraulic device 12 cannot be obtained.

A recess angle $\theta 2$ of the inclined outer peripheral surface 20 shown in FIG. 4 can define the structural strengths of the sealing portion 18 and its vicinity and the width (sealing width F) of the contact portion between the sealing portion 18 and the funnel-shaped inclined inner peripheral surface 19.

Here, the recess angle $\theta 2$ is set to 7° to 20°. With this, when the sealing portion 18 strongly contacts the funnel-shaped inclined inner peripheral surface 19, each of the plastic deformation of the sealing portion 18 and the plastic strain of the vicinity of the sealing portion 18 falls within the acceptable range. Thus, the sealing portion 18 can appropriately perform the plastic deformation, and the sealing width F within a target range can be formed. Therefore, the high-performance sealing of the oil passage 13 can be realized. In FIG. 4, a portion shown by a chain double-dashed line in the sealing portion 18 is a portion where the plastic deformation has occurred.

If the recess angle $\theta 2$ is smaller than 7°, a gap between the inclined outer peripheral surface 20 formed at the lower peripheral surface portion of the sealing portion 18 and the inclined inner peripheral surface 19 of the hydraulic device 12 increases. Therefore, even if the sealing portion 18 performs the plastic deformation, the sealing width F cannot be increased up to the target range, and the plastic strain tends to increase. If the recess angle $\theta 2$ exceeds 20°, the structural strengths of the sealing portion 18 and its vicinity increase. Thus, the plastic deformation of the sealing portion 18 itself decreases, and the sealing width F within the target range cannot be realized.

The circular constricted portion 21 shown in FIG. 4 is formed such that when the external thread portion 15 of the filler plug 11 is tightened with respect to the internal thread portion 14 to cause the sealing portion 18 to strongly contact the funnel-shaped inclined inner peripheral surface 19, the portion where the constricted portion 21 is formed does not contact the funnel-shaped inclined inner peripheral surface 19, and the sealing portion 18 can surely, strongly contact the funnel-shaped inclined inner peripheral surface 19.

The curvature radius RA1 of the constricted portion 21 can define how much the force acting on the head portion 16 of the filler plug 11 when the filler plug 11 is tightened concentrates on the constricted portion 21. Further, the curvature radius RA1 of the constricted portion 21 can define the structural strengths of the constricted portion 21, the sealing portion 18, and its vicinity and the degree of the plastic deformation of the sealing portion 18.

Here, the lower limit of the curvature radius RA1 of the constricted portion 21 is set to 0.2 mm, and the upper limit thereof is set to a value obtained by multiplying 0.1 by the nominal designation value of the external thread portion. With this, the concentration stress can be prevented from being applied to the constricted portion 21 when the filler plug 11 is tightened, and the sealing width F between the sealing portion 18 and the funnel-shaped inclined inner peripheral surface 19 can be set within the target range.

If the curvature radius RA1 is shorter than 0.2 mm that is the lower limit, the stress concentration applied to the constricted portion 21 exceeds the acceptable range, For example, when the nominal designation of the external thread portion 15 is M7, and the curvature radius exceeds 0.7 mm (0.1×7 (the nominal designation value of the external thread portion 15)), the structural strengths of the constricted portion 21, the sealing portion 18, and its vicinity increase. Thus, the plastic deformation of the sealing portion 18 itself decreases, and the sealing width F within the target range cannot be realized.

Further, when the tool is caused to engage with the engaging recess 17 formed on the head portion 16 of the filler plug 11 shown in FIG. 3, and the external thread portion 15 of the filler plug 11 is tightened with respect to the internal thread portion 14, twisting force acts on the head portion 16 of the filler plug 11. The dimensionless value of the engaging recess depth D1 can define the engaging force between the engaging recess 17 and the tool in the tightening direction in consideration of the twisting force.

Here, the dimensionless value of the engaging recess depth D1 is set to 0.30 to 0.33. With this, the engaging force between the engaging recess 17 and the tool in the tightening direction can be set within the target range. Thus, by tightening the filler plug 11 at a high tightening torque (about 20 Nm), the oil passage 13 in which the pressure is high (about 10 to 60 MPa) can be surely sealed by the sealing portion. 18 of the filler plug 11. In addition, the depth D1 of the engaging recess 17 can be made small. With this, the height H1 of the head portion 16 can be made small. Therefore, the depth D2 of the funnel-shaped inclined inner peripheral surface 19 formed in the oil passage 13 of the hydraulic device 12 can be made small, and the thickness of the hydraulic device 12 can be made small.

If the dimensionless value of the engaging recess depth D1 is smaller than 0.30, the engaging force between the engaging recess 17 and the tool does not reach the target range. If the dimensionless value exceeds 0.33, an adequate effect for reducing the thickness of the hydraulic device 12 cannot be obtained.

Next, the taper angle $\theta 1$ of the tapered portion 22 formed at the upper peripheral surface portion of the sealing portion 18 shown in FIG. 3 and the taper angle $\theta 3$ of the funnel-shaped inclined inner peripheral surface 19 of the hydraulic device 12 shown in FIG. 3 will be explained.

In a mechanism in which when the external thread portion 15 of the filler plug 11 shown in FIG. 3 is tightened with respect to the internal thread portion 14, the sealing portion 18 of the filler plug 11 which is caused to strongly contact the funnel-shaped inclined inner peripheral surface 19 of the hydraulic device 12 performs the plastic deformation to form the contact portion, the taper angle $\theta 1$ of the tapered portion 22 formed at the upper peripheral surface portion of the sealing portion 18 and the taper angle $\theta 3$ of the funnel-shaped inclined inner peripheral surface 19 can define the width (the sealing width F) of the contact portion and the plastic deformation and plastic strain of the head portion 16 and constricted portion 21 of the filler plug 11.

Here, the taper angle $\theta 1$ of the tapered portion 22 formed at the upper peripheral surface portion of the sealing portion 18 is set to substantially 40°, and the taper angle $\theta 3$ of the funnel-shaped inclined inner peripheral surface 19 is set to substantially 60°. With this, even if the height H1 of the head portion 16 of the filler plug 11 is made small, each of the plastic deformation of the sealing portion 18 and the plastic strain of the vicinity of the sealing portion 18 when the filler plug 11 is tightened at a high tightening torque to, for example, seal the oil passage 13 in which the pressure is high can be adjusted within the acceptable range. Thus, the oil passage 13 in which the pressure is high can be surely sealed by the sealing portion 18 of the filler plug 11.

The above embodiment has explained an example in which the opening end portion of the oil passage 13 in which the pressure is high is sealed by using the filler plug 11. However, the opening end portion of the oil passage 13 in which the pressure is low can also be sealed by using the filler plug 11.

INDUSTRIAL APPLICABILITY

As above, the filler plug for the hydraulic device according to the present invention has excellent effects in which: the high-performance sealing of the through hole, in which the pressure is high, of the hydraulic device can be realized by tightening the filler plug with respect to the internal thread portion formed in the through hole at a high tightening torque; and the reductions in the size and cost of the hydraulic device can be realized by reducing the thickness of the hydraulic device, the reduction in the thickness of the hydraulic device being realized by realizing a small height of the head portion and a small depth of the funnel-shaped inclined inner peripheral surface formed in the through hole of the hydraulic device. The present invention is suitably applied to such a filler plug for a hydraulic device.

REFERENCE SIGNS LIST 11 filler plug for hydraulic device
12 hydraulic device
13 oil passage (through hole)
14 internal thread portion
15 external thread portion
16 head portion
17 engaging recess
18 sealing portion
19 inclined inner peripheral surface
20 inclined outer peripheral surface
21 constricted portion
22 tapered portion

The invention claimed is:

1. A metal filler plug for a hydraulic device and for use with a tool, the hydraulic device defining a through hole and an internal thread portion formed therein, the hydraulic device also defining a funnel-shaped inclined inner peripheral surface at one end of the internal thread portion, the plug comprising:

an external thread portion that defines an upper end portion;

a head portion, having a larger diameter than the external thread portion, formed on the upper end portion of the external thread portion, the head portion defining an upper end portion and an engaging recess formed on an upper end surface thereof;

a circular sealing portion formed at a lower edge portion of the head portion strongly contacts the funnel-shaped inclined inner peripheral surface by virtue of the tool engaging with the engaging recess of the head portion and the external thread portion thereby being tightened with respect to the internal thread portion, the sealing portion defining an upper side, the sealing portion extends outwardly in a direction that is away from the external thread portion;

an upper peripheral surface portion located at the upper side of the sealing portion, the upper peripheral surface portion being formed as a tapered portion configured to increase in diameter in a direction from the sealing portion toward the upper end portion of the head portion; and a circular constricted portion having a circular-arc cross section formed between the sealing portion and the upper end portion of the external thread portion so as to couple the sealing portion with the upper end portion of the external thread portion;

wherein a dimensionless value of a head portion height from the upper end surface of the head portion to the sealing portion comprises a dimensionless value being obtained by dividing the head portion height by a nominal designation value of the external thread portion; and wherein the sealing portion strongly contacts the inclined inner peripheral surface to perform plastic deformation.

2. The filler plug according to claim 1, wherein:

a downwardly inclined outer peripheral surface is formed at a lower peripheral surface portion of the sealing portion;

the inclined outer peripheral surface decreases in diameter in a direction from the sealing portion toward the external thread portion; and a recess angle of the inclined outer peripheral surface with respect to a horizontal plane perpendicular to a central axis of the external thread portion ranges from 7° to 20°.

3. The filler plug according to claim 1, wherein a lower limit of a curvature radius of the circular constricted portion is 0.2 mm, and an upper limit of the curvature radius of the circular constricted portion is a value obtained by multiplying 0.1 by the nominal designation value of the external thread portion.

4. The filler plug according to claim 1, wherein a dimensionless value of an engaging recess depth, that is, a dimensionless value obtained by dividing a depth of the engaging recess, which is formed on the head portion and with which the tool is able to engage, by the nominal designation value of the external thread portion ranges from 0.30 to 0.33.

5. The filler plug according to claim 1, wherein:

a taper angle of the tapered portion formed at the upper peripheral surface portion located at the upper side of the sealing portion is substantially 40°; and a taper angle of the funnel-shaped inclined inner peripheral surface is substantially 60°.

6. The filler plug according to claim 1, wherein the sealing portion creates a space between the funnel-shaped inclined inner peripheral surface and the head portion.

* * * * *